US006718379B1

(12) United States Patent
Krishna et al.

(10) Patent No.: US 6,718,379 B1
(45) Date of Patent: Apr. 6, 2004

(54) SYSTEM AND METHOD FOR NETWORK MANAGEMENT OF LOCAL AREA NETWORKS HAVING NON-BLOCKING NETWORK SWITCHES CONFIGURED FOR SWITCHING DATA PACKETS BETWEEN SUBNETWORKS BASED ON MANAGEMENT POLICIES

(75) Inventors: Gopal S. Krishna, San Jose, CA (US); Peter Ka-Fai Chow, San Jose, CA (US); Somnath Viswanath, San Jose, CA (US); Shr-Jie Tzeng, Fremont, CA (US); Mrudula Kanuri, Santa Clara, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 637 days.

(21) Appl. No.: 09/590,685

(22) Filed: Jun. 9, 2000

(51) Int. Cl.[7] ............................................. G06F 15/173
(52) U.S. Cl. ...................... 709/223; 709/220; 709/238
(58) Field of Search ................. 709/223, 224, 709/217, 238, 220, 249

(56) References Cited

U.S. PATENT DOCUMENTS

| | | | | |
|---|---|---|---|---|
| 5,802,054 A | * | 9/1998 | Bellenger | 370/401 |
| 5,949,786 A | * | 9/1999 | Bellenger | 370/401 |
| 5,953,335 A | | 9/1999 | Erimli et al. | |
| 6,091,725 A | * | 7/2000 | Cheriton et al. | 370/392 |
| 6,157,623 A | * | 12/2000 | Kerstein | 370/315 |
| 6,167,445 A | * | 12/2000 | Gai et al. | 709/223 |
| 6,170,009 B1 | * | 1/2001 | Mandal et al. | 709/223 |
| 6,463,475 B1 | * | 10/2002 | Calhoun | 709/227 |
| 6,496,478 B1 | * | 12/2002 | Choi et al. | 370/229 |

* cited by examiner

Primary Examiner—Zarni Maung
Assistant Examiner—Philip B. Tran
(74) Attorney, Agent, or Firm—Manelli Denison & Selter PLLC; Leon R. Turkevich

(57) ABSTRACT

A centralized policy server sends policy messages, that describe network management policy, to network switches. Each policy message includes a packet attribute that enables a network switch to uniquely identify a received data packet, and either a priority level or network switch action that describes the switching operation to be performed by the network switch. The network switches are configured for implementing the network management policy by storing switching actions for prescribed data packets, and templates that specify frame data parameters for identifying the prescribed data packets. Each network switch, configured for performing layer 2 and layer 3 switching in an Ethernet (IEEE 802.3) network without blocking of incoming data packets, includes in each network switch port a packet classifier module configured for classifying a received data packet based on a template generated based on the policy messages. In particular, the network switch stores a plurality of user-programmable templates, each configured for identifying a corresponding class of data packet.

19 Claims, 6 Drawing Sheets

SYSTEM AND METHOD FOR NETWORK MANAGEMENT OF LOCAL AREA NETWORKS HAVING NON-BLOCKING NETWORK SWITCHES CONFIGURED FOR SWITCHING DATA PACKETS BETWEEN SUBNETWORKS BASED ON MANAGEMENT POLICIES

BACKGROUND OF THE INVENTION

1. Field of the Invention

The present invention relates to network management of local area networks having non-blocking network switches configured for switching data packets between subnetworks.

2. Background Art

Local area networks use a network cable or other media to link stations on the network. Each local area network architecture uses a media access control (MAC) enabling network interface devices at each network node to access the network medium.

The Ethernet protocol IEEE 802.3 has evolved to specify a half-duplex media access mechanism and a full-duplex media access mechanism for transmission of data packets. The full-duplex media access mechanism provides a two-way, point-to-point communication link between two network elements, for example between a network node and a switched hub.

Switched local area networks are encountering increasing demands for higher speed connectivity, more flexible switching performance, and the ability to accommodate more complex network architectures. For example, commonly-assigned U.S. Pat. No. 5,953,335 discloses a network switch configured for switching layer 2 type Ethernet (IEEE 802.3) data packets between different network nodes; a received data packet may include a VLAN (virtual LAN) tagged frame according to IEEE 802.1q protocol that specifies another subnetwork (via a router) or a prescribed group of stations. Since the switching occurs at the layer 2 level, a router is typically necessary to transfer the data packet between subnetworks.

Efforts to enhance the switching performance of a network switch to include layer 3 (e.g., Internet protocol) processing may suffer serious drawbacks, as current layer 2 switches preferably are configured for operating in a non-blocking mode, where data packets can be output from the switch at the same rate that the data packets are received. Newer designs are needed to ensure that higher speed switches can provide both layer 2 switching and layer 3 switching capabilities for faster speed networks such as 100 Mbps or gigabit networks.

Another problem with existing layer 2 network switches is that network administrators must locally configure each layer 2 switch. In particular, a network administrator may wish to implement management policies that provide advanced control of switching operations for multiple network switches serving respective subnetworks. Such advanced control, however, would require the network administrator to locally modify the configuration settings for each layer 2 switch, resulting in substantial inconvenience to the network administrator. Although the network administrator could implement local management programs that dynamically control the corresponding layer 2 switch, the amount of dynamic control is limited to the pre-programed local management parameters, hence the network administrator would still need to locally modify the configuration settings for new management policies that need to be implemented. Hence, the network administrator would be unable to implement dynamic management policies that may require adaptive switching operations.

SUMMARY OF THE INVENTION

There is a need for an arrangement that enables a network switch to be remotely programmed by a network administrator for implementation of management policies.

There is also a need for an arrangement that enables implementation of a centrally administered network management policy within network switches that control switching of data packets for respective local area networks according to the network management policy.

These and other needs are attained by the present invention, where a policy server sends policy messages, that describe network management policy, to network switches. The network switches are configured for implementing the network management policy by storing switching actions for prescribed data packets, and templates that specifies frame data parameters for identifying the prescribed data packets.

One aspect of the present invention provides a method including the steps of outputting from a policy server a policy message specifying a prescribed network management policy, and receiving the policy message by a network switch system configured for switching data packets in a local area network. The network switch system generates a switching action that specifies a prescribed switching operation to be performed by the network switch system for a corresponding prescribed data packet based on the received policy message. The network switch system also generates at least one template configured for identifying the prescribed data packet from data packets received from the local area network. The network switch system selectively switches the data packets received from the local area network based on the received policy message. Outputting a policy message from a policy server that specifies a prescribed network management policy enables the centralized administration of network management policy, where management policies can be dynamically control from a centralized location. Moreover, the generation of a switching action and the template by the network switch system enables the centrally administered network management policy to be implemented throughout local area networks without local management intervention.

Another aspect of the present invention provides a network switching system. The network switching system includes a policy server configured for storing prescribed network management policies for network stations. The policy server is configured for outputting a policy message specifying a selected one of the prescribed network management policies. The network switching system also includes a network switch system having switching logic and network switch ports. The switching logic includes a switching table configured for storing a switching action that specifies a prescribed switching operation to be performed for a corresponding prescribed data packet based on the received policy message. Each network switch port has a packet classification module configured for classifying each data packet received on the corresponding network switch port. A template used for identifying the prescribed data packet is stored in the packet classification module of a selected one of the network switch ports, and the switching logic executes the switching action in response to the packet classification module of the one network switch port identifying a received data packet as the prescribed data packet.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral designations represent like element elements throughout and wherein.

BEST MODE FOR CARRYING OUT THE INVENTION

Figure 1:
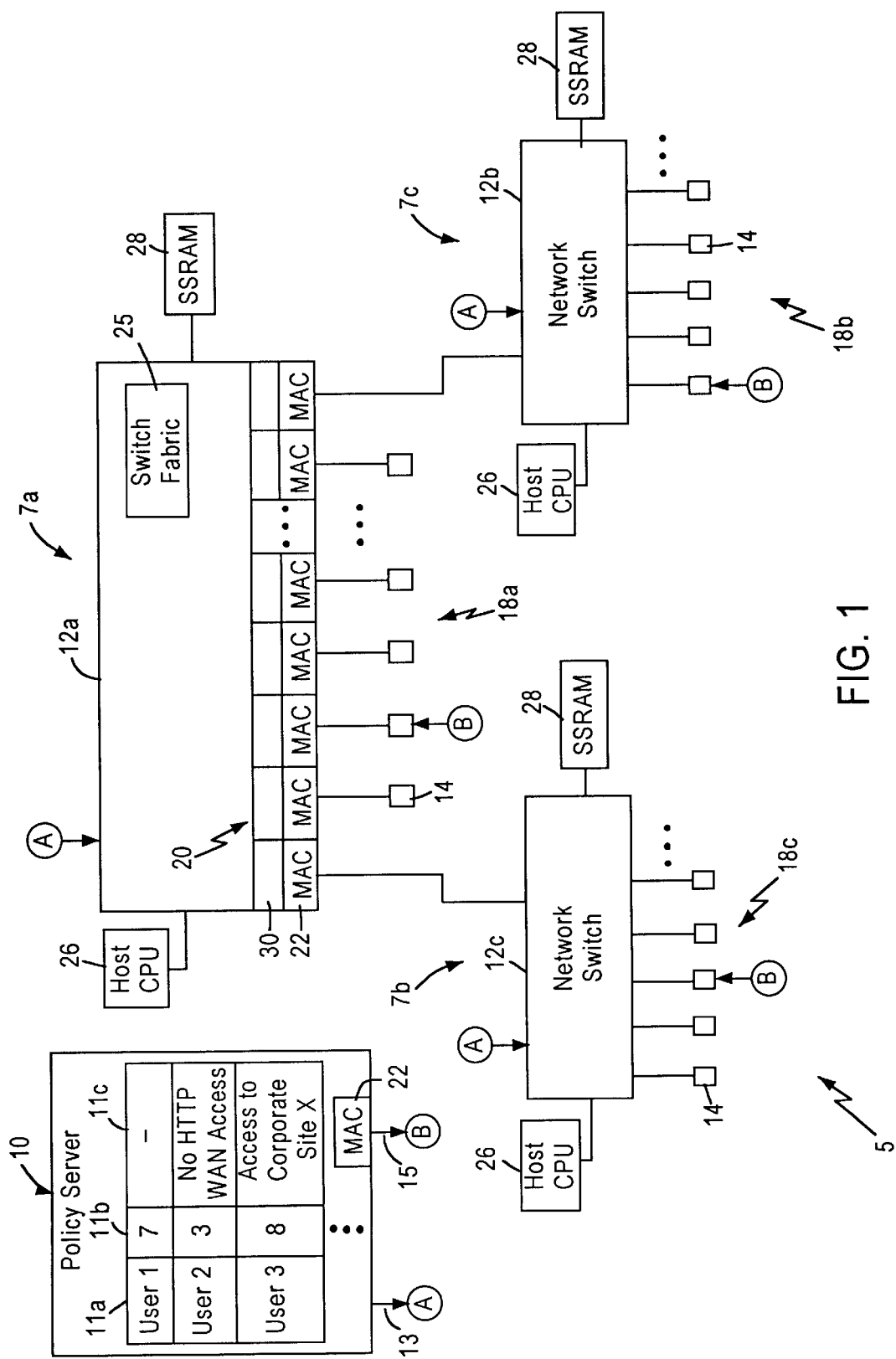
FIG. 1 is a block diagram of a centrally managed network switching system having multiple network switches for switching data packets between respective subnetworks according to an embodiment of the present invention.

FIG. 1 is a diagram of a centrally managed network switching system 5 according to an embodiment of the present invention. The centrally managed network switching system 5 includes a policy server 10 having a policy table 11 configured for storing prescribed network management policies, described below. The network switching system 5 also includes a plurality of network switch systems 7 for serving respective local area networks, for example Ethernet (IEEE 802.3) networks, wherein each network switch system 7 includes an integrated (i.e., single chip) multiport network switch 12 and a host processor 26. Each network switch 12 has network switch ports 20, where each network switch port 20 includes a packet classifier module 30 configured for identifying data flows.

The integrated multiport switches 12 enable communication of data packets between network stations 14. Each network station 14, for example a client workstation, is typically configured for sending and receiving data packets at 10 Mbps or 100 Mbps according to IEEE 802.3 protocol. Each of the integrated multiport switches 12 are interconnected by gigabit Ethernet links 16, enabling transfer of data packets between subnetworks 18a, 18b, and 18c. Hence, each subnetwork includes a switch 12, and an associated group of network stations 14.

Each switch 12 includes a switch port 20 that includes a media access control (MAC) module 22 that transmits and receives data packets to the associated network stations 14 across 10/100 Mbps physical layer (PHY) transceivers (not shown) according to IEEE 802.3u protocol. Each switch 12 also includes a switch fabric 25 configured for making frame forwarding decisions for received data packets. In particular, the switch fabric 25 is configured for layer 2 switching decisions based on source address, destination address, and VLAN information within the Ethernet (IEEE 802.3) header, the switch fabric 25 is also configured for selective layer 3 and above switching decisions based on evaluation of an IP data packet within the Ethernet packet.

As shown in FIG. 1, each switch 12 has an associated host CPU 26 and a buffer memory 28, for example an SSRAM. The host CPU 26 controls the overall operations of the corresponding switch 12, including programming of the switch fabric 25. The buffer memory 28 is used by the corresponding switch 12 to store data frames while the switch fabric 25 is processing forwarding decisions for the received data packets.

The switch fabric 25 is configured for performing layer 2 switching decisions and layer 3 switching decisions. Use of layer 3 switching decisions by the switch fabric 25 enables the switch fabric 25 to make intelligent decisions as far as how to handle a packet, including advanced forwarding decisions, and whether a packet should be considered a high-priority packet for latency-sensitive applications, such as video or voice. Use of layer 3 switching decisions by the switch fabric 25 also enables the policy server 10 to remotely program a switch, for example switch 12b, by sending a policy message having an IP address corresponding to the IP address of the switch 12b; the switch 12b, in response to detecting a policy message addressed to the switch 12b, can forward the policy message to the corresponding host CPU 26 for programming of the switch 12b.

According to the disclosed embodiment, each switch port 20 of FIG. 1 includes a packet classifier module 30 that is configured for classifying received data packets based on user-programmable templates, described below, enabling the switching fabric 25 in response to execute the appropriate layer 3 switching decision. For example, certain data packets may require special switching operations, where the data packets may be uniquely identified by any one of a specific value for a IP source address, an IP destination address, a transmission control protocol (TCP) source port, a TCP destination port, a user datagram protocol (UDP) source port, and/or a UDP destination port, or any combination thereof. However, implementing a layer 3 lookup within the switch fabric 25 would impose extremely heavy processing requirements on the switch fabric 25, preventing the switch fabric 25 from performing layer 3 processing in real-time. In particular, the switch fabric 25 would need to perform multiple key searches for each of the address fields (IP source and destination address, TCP source and destination port, UDP source and destination port) in order to uniquely identify the specific layer 3 switching decision corresponding to the unique combination of the layer 3 address fields in a received data packet.

According to the disclosed embodiment, the packet classifier module 30 is configured for classifying a received data packet, and uniquely identifying the received data packet, based on prescribed user-selected portions of the received data packet. In particular, the packet classifier module 30 is able to efficiently generate, store, and match user programmable templates to classify packets based on any portion of frame data within the received data packet. Hence, policies can be implemented by storing specific layer 3 switching decisions (i.e., switching actions) in the switch fabric 25, and storing within the packet classifier module 30 templates that classify packets for selection of the layer 3 switching decisions.

The policy server 10 is configured for outputting a policy message specifying one of the prescribed network management policies for a selected one of the network switch systems 7. For example, the policy server 10 includes a policy table 11 configured for storing, for each network management policy, a packet attribute 11a, a priority level 11b, and a network switch actions 11c. For example, different users may be assigned different priority values and have access to different network resources. Hence, the policy server 10 may output to the network switch system 7a a policy message that specifies a prescribed network management policy such as assigning a priority (e.g., "7") for a user having a unique packet attribute (e.g., a source MAC or IP address having an assigned value represented as "User1"). The prescribed network management policy may also specify a network switch action in addition to the assigned priority level, wherein the policy message specifies the packet attribute 11a (e.g., "User2"), the priority level 11b (e.g., "3"), and the network switch action 11c (e.g., "No HTTP WAN Access").

The policy server 10 transfers the policy message to a selected one of the network switch systems 7 that serves the corresponding user via an out of band signaling link 13, such as a serial interface link, or alternately through in-band communications via a data link 15 through the packet switched network 5. Each of the network switch systems 7 include a host CPU 26 configured for executing network switch management software, including maintaining switching table entries, and generating templates for identifying packet attributes from received data packets.

Figure 6:
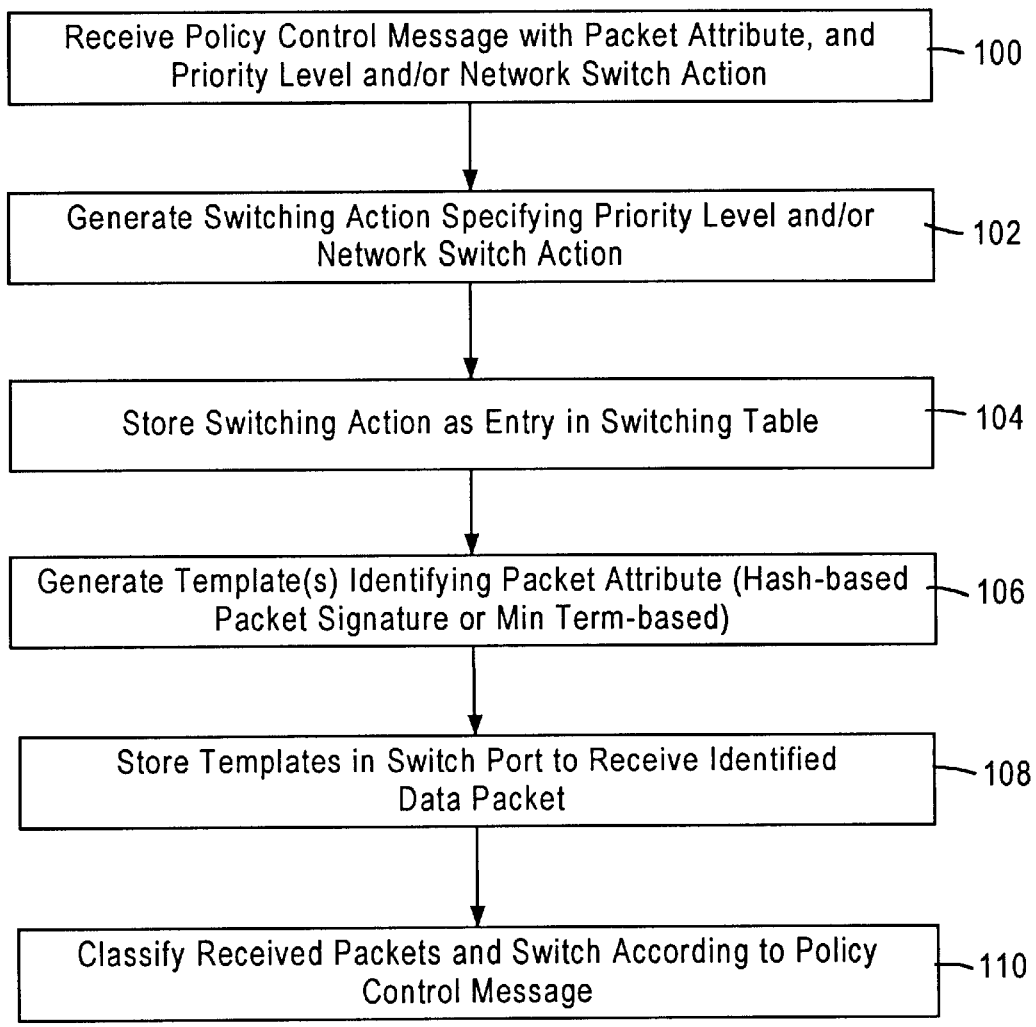
FIG. 6 is a diagram illustrating the method of centrally managing the switching system of FIG. 1 according to an embodiment of the present invention.

FIG. 6 is flow diagram illustrating the method for centrally managing the network switching system 5. In response to reception of the policy message in step 100, the host CPU 26 of the network switching system 7 having received the policy message decodes the policy message to obtain the packet attribute 11a, and at least one of the priority level 11b and the network switch action 11c. The host CPU 26 then generates a switching action that specifies at least one of the priority level 11b and the policy-based network switch action 11c in step 102. The switching action generated by the host CPU 26 is then stored in step 104 as a switching entry in a switching table within the switch fabric 25. The stored switching entry can thus be used by the network switch 12 for a data packet received by the network switch 12 and that is identified by the corresponding packet attribute within the policy message.

The host CPU also generates in step 106 templates that enable the network switch 12 to uniquely identify the prescribed data packet based on the corresponding packet attribute within the policy message. The packet attribute 11a may identify any type of data packet, or packet class that requires the corresponding priority level 11b or network switch action 11c. For example, the host CPU 26 may translate the packet attribute 11a (e.g., "User1") to a specific MAC or IP address, or also a specific data flow that has been identified by the policy server 10 and the host CPU 26. Hence, the host CPU generates templates, described below, that specify prescribed data values that are to be present at respective selected portions of a received data packet (e.g., within the layer 2 header, layer 3 header, TCP or UDP source or destination port, etc.).

The host CPU 26 then stores in step 108 the templates in the switch port 22 that is to receive the identified data packet, enabling the switch 12 to begin implementing the network management policy in step 110 by classifying received data packets for identifying a received data packet according to the stored templates, and switching a received packet matching the stored template according to the corresponding stored switching action. For example, if an identified data packet is determined by the switch fabric to have a relatively high priority based on the policy message received from the policy server 10, the switch fabric 25 may selectively output the prescribed data packet to an output switch port based on the corresponding priority level relative to the data packets received by the network switch 12 and the available network switch resources; conversely, if the identified data packet has a relatively low priority, the switch fabric 25 may drop the received data packet in favor of higher priority data packets in order to control utilization of network switch resources. Alternately, the switch fabric 25 may selectively output or drop an identified data packet to an output switch port based on the network switch action specifying that access to the output switch port for the data packet should be granted or denied, respectively.

As described below with respect to FIGS. 2 and 3, the packet classifier module 30 may be configured for identifying data flows by generating hash-based packet signatures for a data packet based on hash action values specified within a user-programmable template. Alternately, the packet classifier module 30 may be configured for identifying data flows based on multiple simultaneous comparisons between the incoming data packet and templates defined by min terms, described below with respect to FIGS. 4, 5A and 5B.

Figure 2:
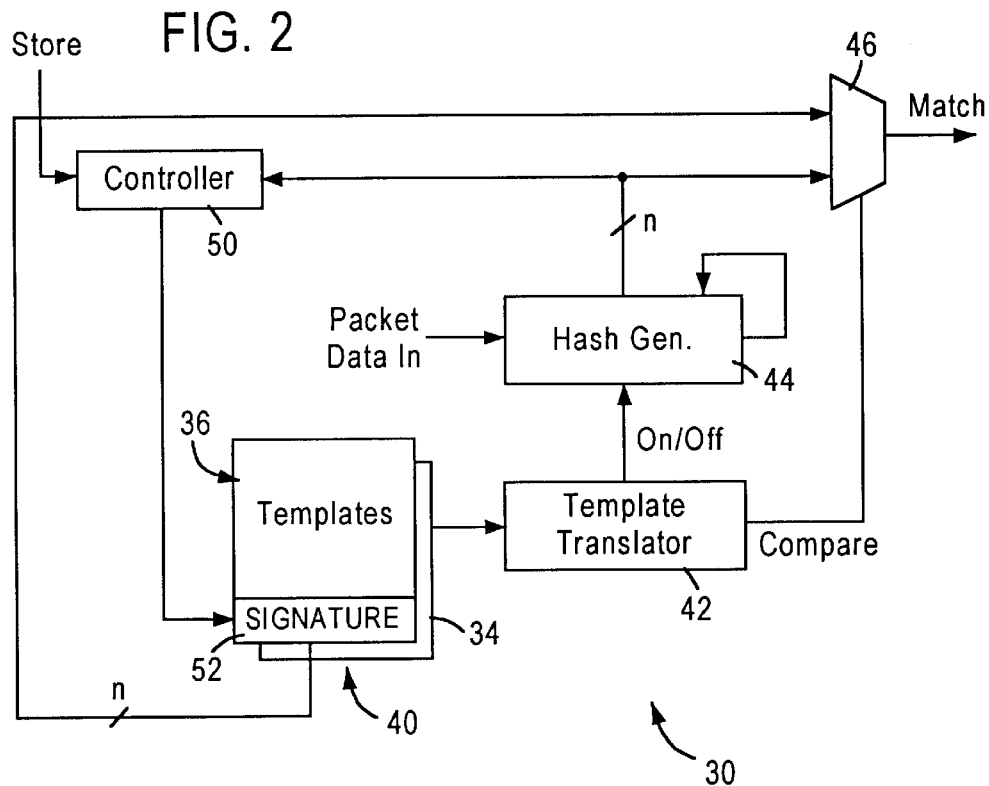
FIG. 2 is a block diagram illustrating the packet classifier module of FIG. 1 according to a first embodiment of the present invention.
Figure 3:
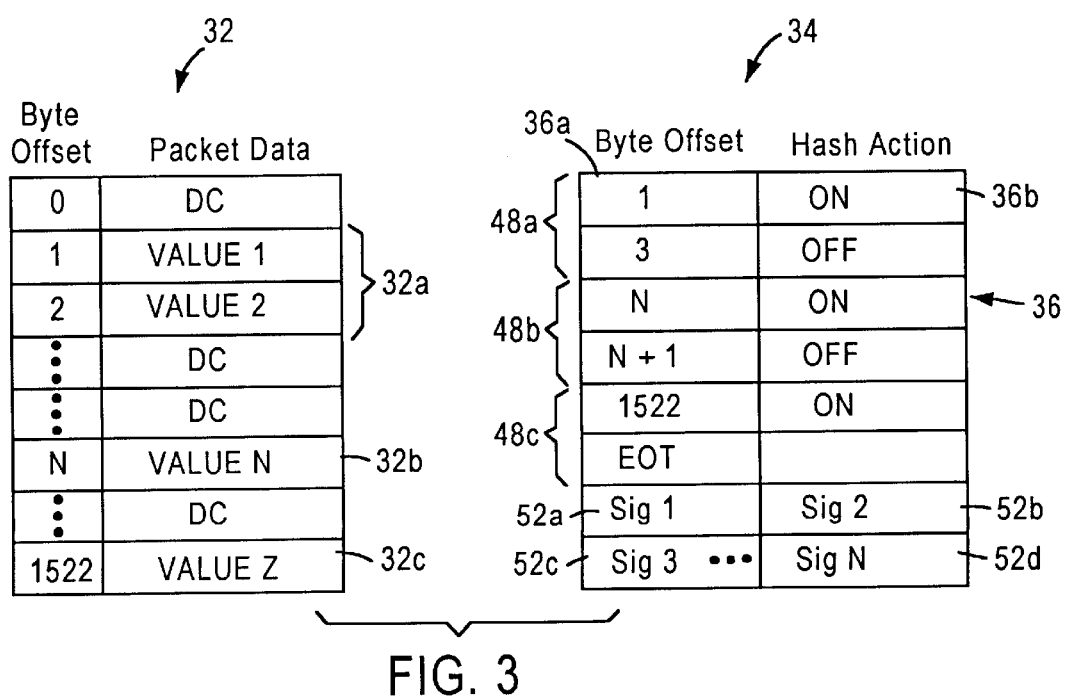
FIG. 3 is a diagram illustrating a received data packet and a user-programmable template used to hash selected portions of the received data packet by the packet classifier module of FIG. 2.

FIG. 2 is a diagram illustrating in detail the packet classifier module 30 according to a first embodiment of the present invention. FIG. 3 is a diagram illustrating a data packet 32 and a user-programmable template 34 used to generate a packet signature by hashing selected portions of the received data packet. The packet classifier 30 includes a template table 40 configured for storing the user-programmable templates 34. The packet classifier 30 also includes a template translator 42, a hash generator 44, and a comparator 46.

Each user-programmable template 34 stored in the template table 40 includes hash action values 36 that specify selected portions of a received data packet to be hashed for generation of a packet signature. In particular, each hash action value 36 specifies a location offset 36a (e.g., a byte offset) relative to the beginning of the received data packet and a hash action 36b. The hash action 36b specifies either an initiate hash action ("on") for initiation of hashing by the hash generator 44, or a halt hash action ("off") specifying halting of hashing by the hash generator 44. For example, the template 34 illustrates that the hash generator 44 is turned on at byte offset 1 and then turned off at byte offset 3, enabling the hashing of the data packet portion 32a. Hence, each hash action value pair 48 specifies a corresponding portion of the data packet 32 that should be hashed by the hash generator 44, such that the hash action value pairs 48a, 48b, and 48c control the hash generator 44 for hashing the portions 32a, 32b and 32c of the data packet, respectively.

The packet classifier module 30 also includes a template controller 50 configured for storing, in response to a store signal, the packet signature of the received data packet 32 as a stored packet signature 52 for the corresponding user-programmable template 34, representing one of the prescribed user-defined switching policies. In particular, template 34 may store a plurality of packet signatures 52a, 52b, 52c, etc., each having a unique value based on a corresponding prescribed value within at least one of the selected portions 32a, 32b, and 32c. During reception of an unknown data packet, the packet signature for the received data packet can be simultaneously compared with the multiple signatures 52a, 52b, 52c, etc. that belong to the corresponding user-programmable template to classify the received data packets based on the user-selected portions 32a, 32b, 32c, etc.. Hence, the storage of a packet signature having prescribed data, for example a prescribed flow identifier, enables the packet classifier module 30 to identify unique data flows based on detecting a correlation by the comparator 46 between one of the stored packet signatures 52, and the packet signature generated for a received data packet.

Figure 4:
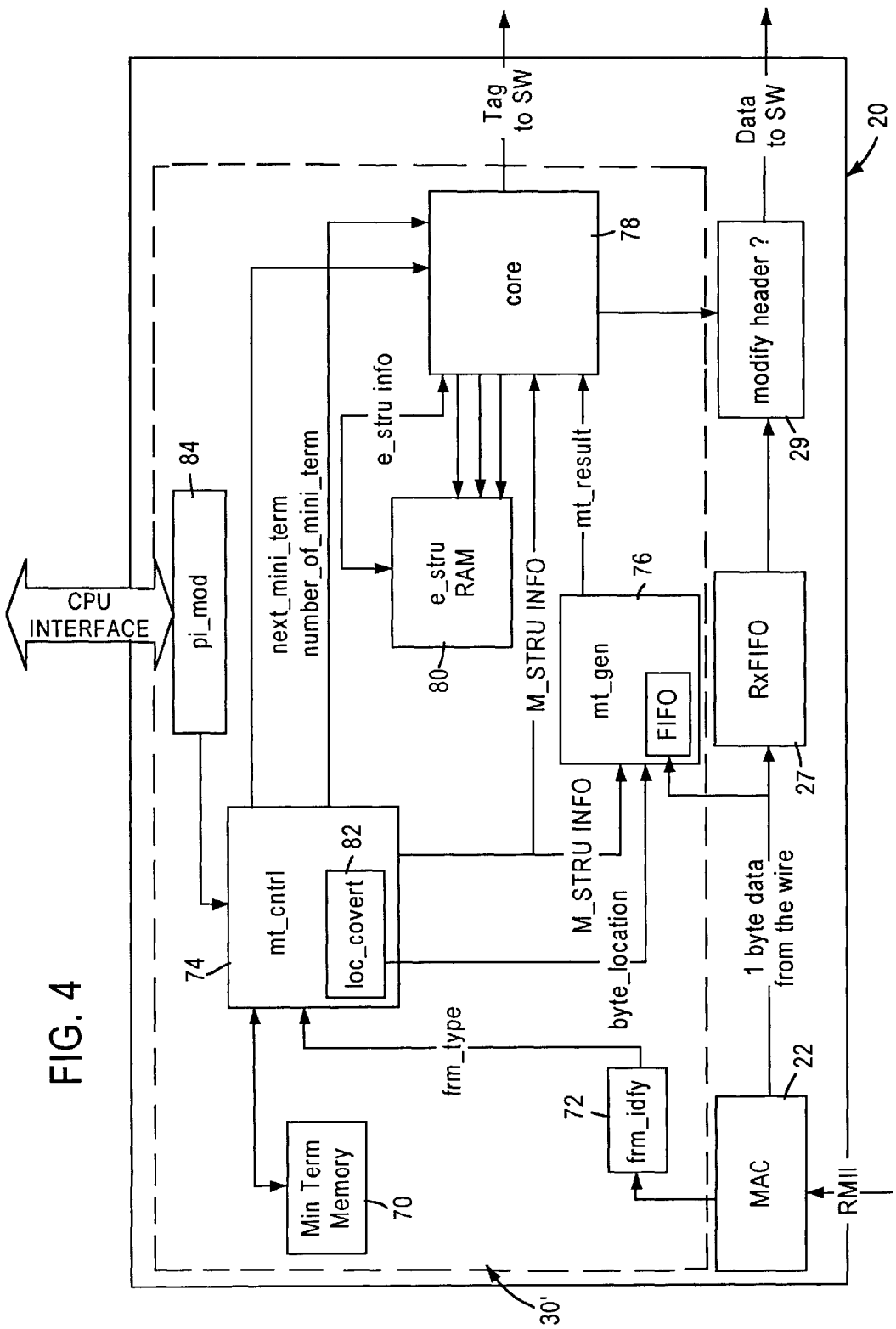
FIG. 4 is a diagram illustrating the packet classifier module of FIG. 1 according to a second embodiment of the present invention.

FIG. 4 is a diagram illustrating an alternative packet classifier 30' configured for classifying packets using min terms according to a second embodiment of the present invention. The packet classifier module 30', based on the comparison between the incoming data packet and the plurality of templates, identifies an equation to be executed that specifies the tag to be supplied to the switch fabric 25. Specifically, the packet classifier module 30' generates a comparison result that identifies the incoming data packet by detecting at least one matched template from a plurality of templates. The packet classifier module 30' then identifies which of the equations includes the matched template, and generates the tag specified by the equation.

Figure 5A:
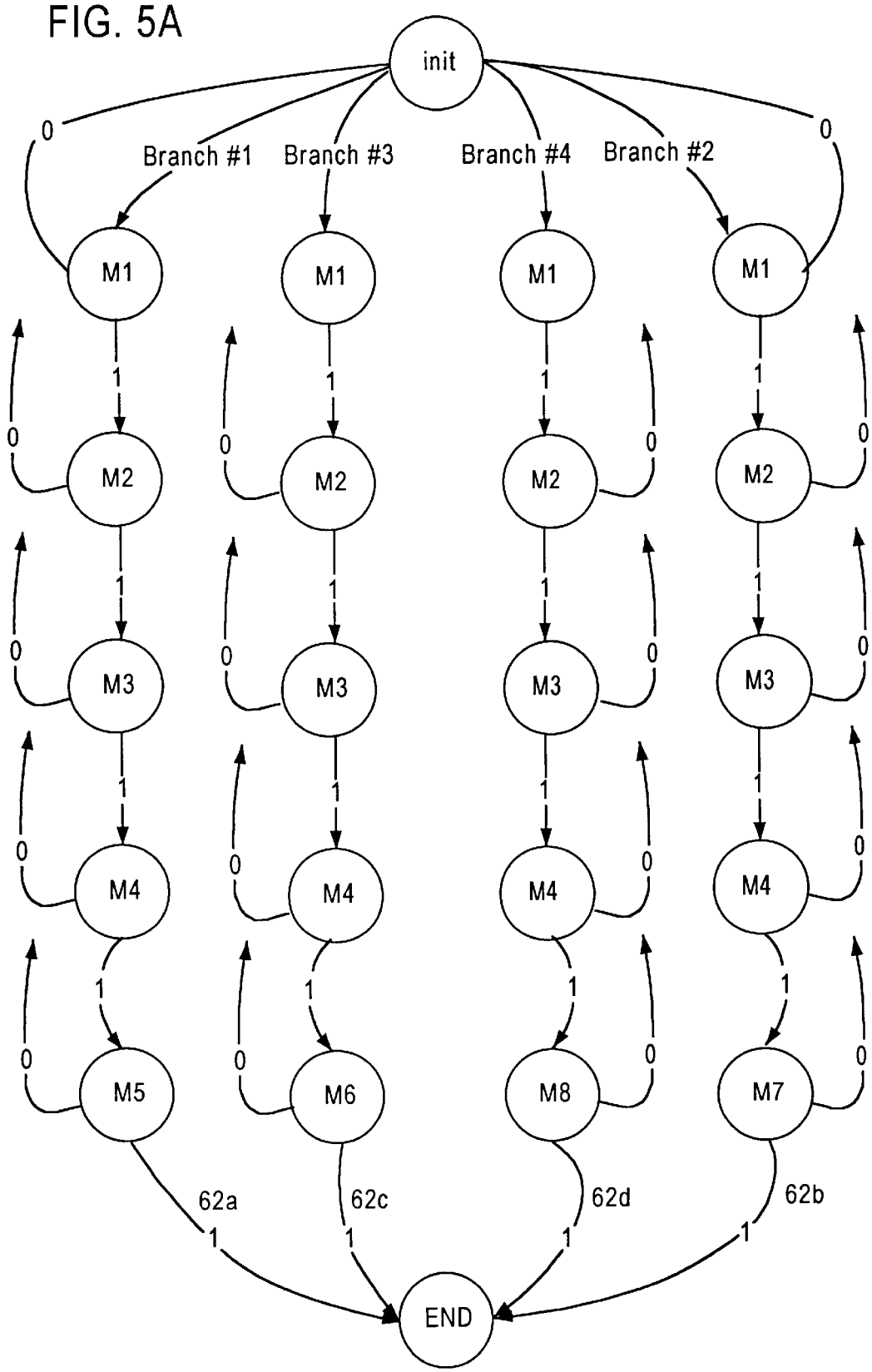
FIGS. 5A and 5B are diagrams illustrating min terms used by the packet classifier module of FIG. 4 for classifying a received data packet.
Figure 5B:
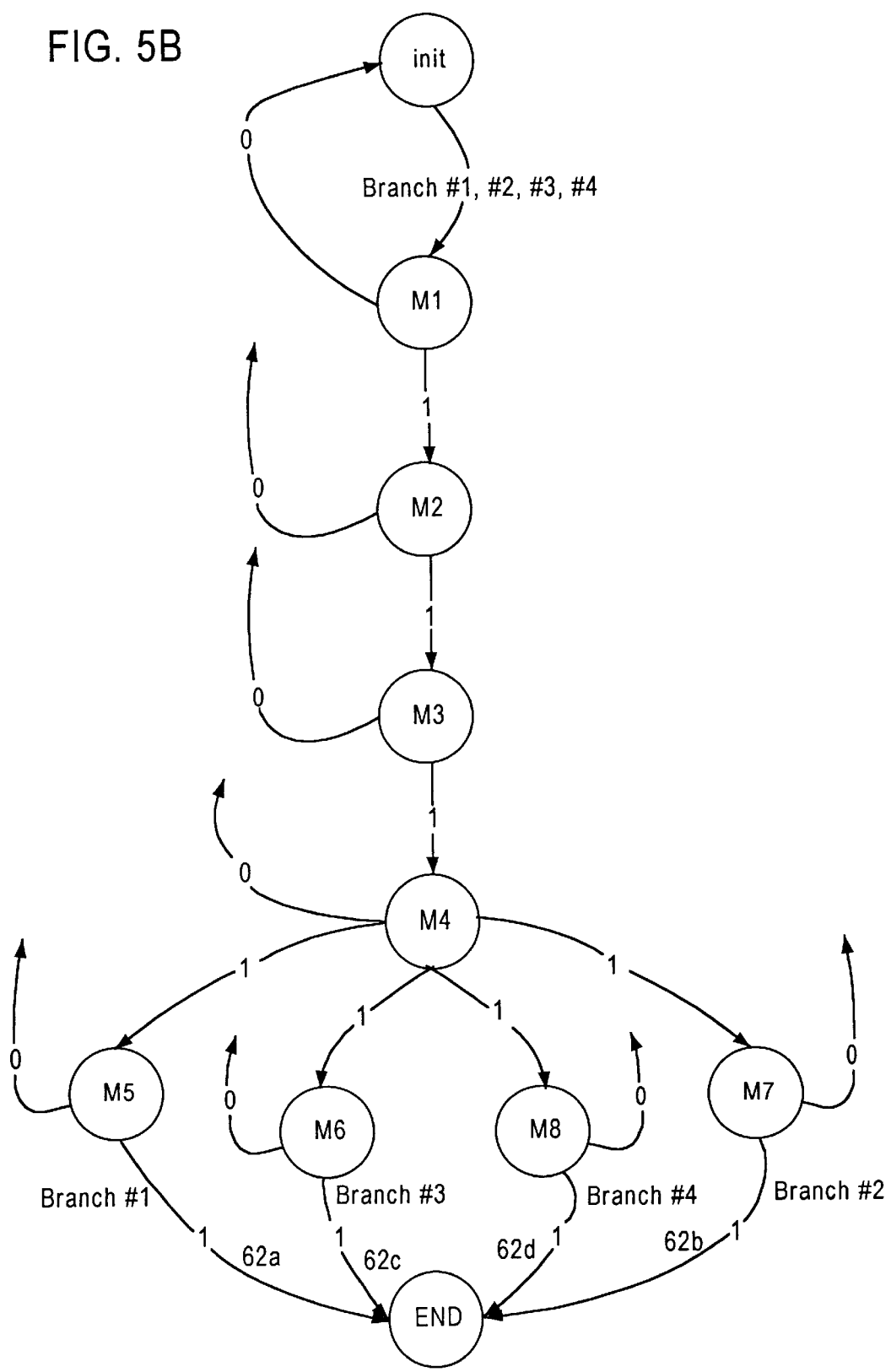

FIGS. 5A and 5B are diagrams illustrating the simultaneous processing of two templates of an equation by the packet classifier module 30'. FIG. 5A illustrates the logical evaluation by the packet classifier module 24 of the equation:

$$Eq1 = M1*M2*M3*M4*(M5+M6+M7+M8).$$

FIG. 5B illustrates how the equation Eq1 would actually be stored in the min term memory 70. The equation Eq1 includes four templates 62a, 62b, 62c, and 62d: the template 62a includes the min terms M1, M2, M3, M4, and M5; the template 62b includes the min terms M1, M2, M3, M4, and M6; the template 62c includes the min terms M1, M2, M3, M4, and M7; and the template 62d includes the min terms M1, M2, M3, M4, and M8. Each template 62 corresponds to a specific IP data format recognizable based on the header of the IP data packet 32. For example, templates 62a and 62c may be configured for identifying an HTTP packet, and templates 62b and 62d be may be configured for identifying an SNMP packet. Specifically, an HTTP packet is identified if it is in IPv4 format, the time to live field in IP is bigger than one, the protocol field in IP header is TCP, header checksum is correct, source TCP port is 80 or destination TCP port is 80. An SNMP packet is identified if it is in IPv4 format, the time to live field in IP is bigger than one, the protocol field in IP header is TCP, header checksum is correct, source TCP port is 25 or destination TCP port is 25.

Hence, the following min terms may be established to represent all the above-described criteria:

M1=packet is in IPv4 format
M2=time to live field in IP is bigger than one
M3=protocol field in IP header is TCP
M4=header checksum is correct
M5=source TCP port is 80
M6=destination TCP port is 80
M7=source TCP port is 25
M8=destination TCP port is 25

Hence, the templates 62a and 62c identify HTTP packets, and the templates 62b and 62d identify SNMP packets. Thus, equation one (Eq1) specifies that a specific result (e.g., the tag having a specified value) should be output to the switch fabric 25 if either template 62a, 62b, 62c, or 62d are true.

Moreover, the min terms M1 ... M8 are arranged within the associated templates 62a and/or 62b in a prescribed order that corresponds to the relative position of a data byte in the incoming data stream. For example, the min term M1 can be configured for comparison with the first byte (B1) of an IP packet, the min term M2 configured for comparison with a subsequent byte (B2) of the IP packet that follows B1, the min term M3 configured for comparison with a subsequent byte (B3) that follows B2, etc. Hence, the use of templates 62 having min terms in an order based on the relative position of a data byte in the incoming data stream enables multiple simultaneous comparisons between the incoming data stream and min terms. Hence, an incoming data packet can be compared to multiple templates to determine not only the data format of the incoming data packet, but also what action needs to be performed by the switch fabric 25.

As shown in FIG. 4, the packet classifier 30', also referred to as a network switch port filter, includes a min term memory 70 for storing the min term values (e.g., M1, M2, etc.). The packet classifier 30' also includes a flame identifier 72 configured for identifying the type of layer 2 frame being received; in particular, identifying the type of layer 2 frame being received (e.g.., Ethernet, IEEE 802 to 3, etc.) enables identification of the start position of the EP packet within the layer 2 packet. The packet classifier 30' also includes a min term controller 74, a min term generator 76, an equation core 78, and an evaluation results memory 80. A processor interface module (pi_mod) 82 is used for transferring the generated min terms from the host CPU 26 into the min term memory 70.

The min term controller 74 is configured for fetching the min terms from the min term memory 70 corresponding to a selected byte of the IP frame. The min term controller 74 also includes a location converter configured for specifying the actual byte location (byte_location) of the start point in response to receiving a frame type (frm_type) signal from the frame identifier 72 that specifies the type of layer 2 flame. Hence, the min term controller 74, in response to detecting the beginning of the IP packet, fetches all the min terms that are to be compared with the first byte (B1) of the IP packet. The min term controller 74 then forwards the min term values (M_STRU INFO) to the min term generator 76 and the equation core 78.

The min term generator 76 performs the actual min term comparisons between the min terms fetched by the min term controller and the selected byte of the incoming data stream, and provides the min term comparison results (mt_result) to the equation core 78. During the next comparison cycle, the min term generator 76 simultaneously compares the incoming data byte B2 with the appropriate min terms to be compared with that data byte B2. According to the disclosed embodiment, the min term generator is configured for simultaneously comparing the incoming data stream to up to eight min terms.

The equation core 78 is configured for generating a frame tag based on the min term comparison results received from the min term generator 76, relative to the relevant templates 62. For example, the equation core 78 evaluates equation 1, by evaluating the min term results sequentially as the results are supplied from the min term generator. For example, if the comparisons for each of the min terms M1, M2, M3, M4, and M6 result in a true condition, , then the end condition is matched for template 62c, causing the equation core 78 to generate a tag corresponding to the condition specified for template 62c. The frame tag identifies the nature of the incoming data packet, as well as the action that needs to be performed by the switch fabric 25.

According to the disclosed embodiment, network management policies can be centrally administered by outputting policy message is from a policy server to network switch systems that are programmable for advanced switching operations based on classified packets. Templates can be efficiently generated based on the received policy messages to classify packets based on any field contained within the packet. Hence, packet templates for any type of data flow can be stored and processed at wire speed, enabling flow based identification within each network switch port at the wire rate. Moreover, the packet template generated for a received data packet can be simultaneously compared with any number of stored packet templates to determine a match, merely by increasing the number of comparators. Packet classification at the network switch port thus enables advanced switching operations to be implemented within the switch fabric based on the received policy message. Hence, the policy messages output from a centralized policy server can be enforced within network switches without local intervention by a user.

While this invention has been described with what is presently considered to be the most practical preferred embodiment, it is to be understood that the invention is not limited to the disclosed embodiments, but, on the contrary, is intended to cover various modifications and equivalent arrangements included within the spirit and scope of the appended claims.

What is claimed is:

1. A method comprising:

outputting from a policy server a policy message specifying a prescribed network management policy;

receiving the policy message by a network switch system configured for switching data packets in a local area network;

first generating, in the network switch system, a switching action that specifies a prescribed switching operation to be performed by the network switch system for a corresponding prescribed data packet based on the received policy message;

second generating, in the network switch system, at least one template configured for identifying the prescribed data packet from data packets received from the local area network; and selectively switching the data packets received from the local area network, by the network switch system, based on the received policy message.

2. The method of claim 1, wherein the outputting step includes specifying a packet attribute for identifying the prescribed data packet, and at least one of a priority level and a network switch action that describes the prescribed switching operation to be performed by the network switch system.

3. The method of claim 2, wherein the first generating step includes generating the switching action based on the at least one of a priority level and a network switch action, and storing the switching action as an entry in a switching table in the network switch system.

4. The method of claim 3, wherein the first generating step includes specifying a priority for switching the corresponding prescribed data packet by the network switch system based on the priority level.

5. The method of claim 4, wherein the selectively switching step includes selectively outputting the prescribed data packet, received by the network switch system, on an output switch port based on the corresponding priority level relative to the data packets received from the local area network.

6. The method of claim 4, wherein the selectively switching step includes selectively dropping the prescribed data packet, received by the network switch system, based on the corresponding priority level relative to the data packets received from the local area network.

7. The method of claim 3, wherein the selectively switching step includes selectively outputting the prescribed data packet, received by the network switch system, on an output switch port based on the network switch action specifying that access to the output switch port for the prescribed data packet is granted.

8. The method of claim 3, wherein the selectively switching step includes selectively dropping the prescribed data packet, received by the network switch system, based on the network switch action specifying that access to the output switch port for the prescribed data packet is denied.

9. The method of claim 1, wherein the outputting step includes sending the policy message to the network switch system via an out of band link.

10. The method of claim 1, wherein the outputting step includes sending the policy message to the network switch system via the local area network.

11. The method of claim 1, wherein:

the outputting step includes specifying a packet attribute for identifying the prescribed data packet; and the second generating step includes generating and storing the at least one template, based on the packet attribute, in a selected network switch port of the network switch system based on a determined source for the prescribed data packet.

12. The method of claim 11, wherein the step of generating and storing the at least one template includes storing a plurality of min terms for the at least one template, each min term specifying a prescribed data pattern for a corresponding portion of the prescribed data packet.

13. The method of claim 11, wherein:

the step of generating and storing the at least one template includes generating and storing a packet signature that represents a hashing of prescribed data patterns from the respective portions of the prescribed data packet according to a prescribed hash function; and the step of selectively switching includes determining whether the packet signature of a received data packet matches the stored packet signature, and selectively switching the received data packet according to the switching action based on a match between the packet signature of the received data packet and the stored packet signature.

14. A network switching system comprising:

a policy server configured for storing prescribed network management policies for network stations, the policy server configured for outputting a policy message specifying a selected one of the prescribed network management policies; and a network switch system comprising:

(1) switching logic having a switching table configured for storing a switching action that specifies a prescribed switching operation to be performed for a corresponding prescribed data packet based on the received policy message, and (2) a plurality of network switch ports, each having a packet classification module configured for classifying each data packet received on the corresponding network switch port, the network switch system storing in the packet classification module of a selected one of the network switch ports a template for identifying the prescribed data packet, the switching logic executing the switching action in response to the packet classification module of the one network switch port identifying a received data packet as the prescribed data packet.

15. The system of claim 14, wherein the switching action specifies a priority for switching the corresponding prescribed data packet based on the received policy message.

16. The system of claim 14, wherein the switching action specifies selective access to a the output switch port for the prescribed data packet based on the received policy message.

17. The system of claim 14, wherein each packet classification module includes a hash generator configured for generating a packet signature that represents a hashing of selected portions of said each data packet received on the corresponding network switch port based on the received policy message, said each packet classification module configured for classifying said each data packet received on the corresponding network switch port based on a comparison with a prescribed signature generated based on the received policy message.

18. The system of claim 14, wherein each packet classification module includes:

a min term memory configured for storing min term values, each min term value stored based on a location of a corresponding selected byte of the incoming data packet for comparison, an expression portion. specifying a corresponding comparison operation, and a template identifier field that specifies templates that use the corresponding min term based on the received policy message; and a min term generator configured for simultaneously comparing a received byte of said each data packet received on the corresponding network switch port with a min term that corresponds to the received byte, the packet classification module classifying said each data packet received on the corresponding network switch port based on an identified one of the templates having min terms that match the respective selected byte of said each data packet received on the corresponding network switch port.

19. The system of claim 14, wherein the network switch system includes a processor configured for generating the switching action and the template based on the received policy message.

* * * * *